(12) United States Patent
Rooney et al.

(10) Patent No.: US 12,535,390 B2
(45) Date of Patent: Jan. 27, 2026

(54) PROCESSES AND SYSTEMS FOR ANALYZING A SAMPLE SEPARATED FROM A STEAM CRACKER EFFLUENT

(71) Applicant: ExxonMobil Chemical Patents Inc., Baytown, TX (US)

(72) Inventors: Mark A. Rooney, Pasadena, TX (US); Phillip S. Wells, Jr., Baton Rouge, LA (US); Spencer A. Egros, Baton Rouge, LA (US); Wellwick F. Brown, Port Barre, LA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 288 days.

(21) Appl. No.: 18/553,385

(22) PCT Filed: Mar. 21, 2022

(86) PCT No.: PCT/US2022/021164
§ 371 (c)(1),
(2) Date: Sep. 29, 2023

(87) PCT Pub. No.: WO2022/220996
PCT Pub. Date: Oct. 20, 2022

(65) Prior Publication Data
US 2024/0175786 A1    May 30, 2024

Related U.S. Application Data

(60) Provisional application No. 63/175,629, filed on Apr. 16, 2021.

(51) Int. Cl.
*G01N 1/10* (2006.01)
*C10G 9/00* (2006.01)
(Continued)

(52) U.S. Cl.
CPC .............. *G01N 1/10* (2013.01); *C10G 9/002* (2013.01); *C10G 9/36* (2013.01); *G01N 1/4077* (2013.01);
(Continued)

(58) Field of Classification Search
CPC .......... C10G 9/002; C10G 9/36; C10G 45/72; C10G 47/00; C10G 47/36; C10G 75/00;
(Continued)

(56) References Cited

U.S. PATENT DOCUMENTS

| 2004/0122276 | A1  | 6/2004 | Ngan |
| 2009/0126260 | A1* | 5/2009 | Aravanis ................ C10G 3/49 |
| | | | 208/113 |
| 2018/0171239 | A1* | 6/2018 | Chen ....................... C10G 1/02 |

FOREIGN PATENT DOCUMENTS

GB    1 529 738    10/1978

* cited by examiner

Primary Examiner — John E Breene
Assistant Examiner — Truong D Phan
(74) Attorney, Agent, or Firm — WOMBLE BOND DICKINSON (US) LLP; Kevin Davis

(57) ABSTRACT

Processes and systems for analyzing a composition of a C3− component separated from a steam cracker effluent. The process can include steam cracking a hydrocarbon feed to produce a steam cracker effluent. The effluent can be cooled to produce a cooled effluent and a sample can be separated therefrom. Heat can be indirectly exchanged from the sample to a heat transfer medium to produce a gas phase product that can include C3− compounds and a first liquid phase product that can include C4+ compounds. The gas phase product can flow through a flow restricting line and into a transport line. The flow restricting line can have an inner cross-sectional area that is <50% of an inner cross-sectional area of the transport line. The gas phase product (Continued)

can flow through the transport line and into an analyzer. An at least partial composition of the gas phase product can be determined.

22 Claims, 2 Drawing Sheets

(51) Int. Cl.
  *C10G 9/36* (2006.01)
  *G01N 1/40* (2006.01)
  *G01N 30/06* (2006.01)

(52) U.S. Cl.
  CPC ....... *G01N 30/06* (2013.01); *G01N 2001/105* (2013.01); *G01N 2001/4088* (2013.01)

(58) Field of Classification Search
  CPC .... C10G 2300/201; C10G 9/00; C10G 9/005; C10G 69/00; G01N 1/10; G01N 1/4077; G01N 2001/105; G01N 2001/4088; G01N 30/06; G01N 2030/8405; G01N 2030/125; B01D 19/0036; B01D 3/06; B01D 5/003; B01D 5/0069; B01D 15/165
  USPC ....... 73/23.41; 585/263, 330, 439, 613, 648, 585/752
  See application file for complete search history.

PROCESSES AND SYSTEMS FOR ANALYZING A SAMPLE SEPARATED FROM A STEAM CRACKER EFFLUENT

CROSS-REFERENCE TO RELATED APPLICATIONS

This application is a US national phase application of PCT Application Serial No. PCT/US2022/021164 having a filing date of Mar. 21, 2022, which claims priority to and the benefit of U.S. Provisional Application No. 63/175,629 having a filing date of Apr. 16, 2021, the disclosures of both of which are incorporated herein by reference in their entireties.

FIELD

Embodiments disclosed herein generally relate to processes and systems for analyzing a sample separated from a steam cracker effluent. More particularly, such embodiments relate to processes and systems for separating a C3− sample from a steam cracker effluent and conveying the C3− sample to an analyzer.

BACKGROUND

Steam cracking is the primary means used to generate ethylene and other products from a variety of feedstocks. Modern plants control furnaces through furnace effluent sample analysis. Sample analysis requires a clean, dry sample free of water, coke, and heavy hydrocarbons. Since steam cracking produces heavies such as tar and coke along with ethylene and propylene, and since steam used in the cracking process needs to be condensed, reliable sample conditioning has proven challenging for steam cracking furnaces throughout the industry.

While effluent analysis provides significant value and is included as a feature in multiple (if not all) steam cracking facilities, such effluent analysis suffers from poor reliability due to several process realities. The analysis of C3− components separated from a steam cracker effluent typically utilizes a gas chromatograph (often called a transfer line analyzer or TLA). The C3− components that need to be analyzed are currently separated in sample conditioning system (often called a transfer line sampler or TLS) that is configured to filter particulates and condense steam and C4+ heavy components to provide the C3− sample for conveyance to the gas chromatograph. The current sample conditioning systems, however, suffer from various outages or malfunctions that include fouling or plugging with foulant, coke, tar, and/or other heavy compounds; insufficient cooling or condensation of steam in the steam cracker effluent; and/or liquid carryover with the C3− sample into the transport tubing.

There is a need, therefore, for improved processes and systems for separating a C3− sample from a steam cracker effluent and conveying the C3− sample to an analyzer. This disclosure satisfies this and other needs.

SUMMARY

Processes and systems for analyzing a composition of a C3− component separated from a steam cracker effluent are provided. In some embodiments, the process can include steam cracking a hydrocarbon feed within one or more radiant coils of a steam cracker to produce a steam cracker effluent that can have a coil outlet temperature. The steam cracker effluent can be cooled to produce a cooled steam cracker effluent. A sample can be separated from the cooled steam cracker effluent. Heat can be indirectly exchanged from the sample to a heat transfer medium to produce a first gas phase product that can include C3− compounds and a first liquid phase product that can include C4+ compounds. The first gas phase product can flow through a flow restricting line and into a transport line. The flow restricting line can have an inner cross-sectional area that is <50% of an inner cross-sectional area of the transport line. The first gas phase product can flow through the transport line and into an analyzer. An at least partial composition of the first gas phase product can be determined.

In some embodiments, the system for analyzing a composition of a C3− component separated from a steam cracker effluent can include a sample line having an inlet configured to receive a sample of a steam cracker effluent from a steam cracker effluent line. The system can also include an indirect heat exchanger having an inlet configured to receive the sample from an outlet of the sample line and to cool the sample by indirect heat exchange with a heat transfer medium to produce a first gas phase product comprising C3− compounds and a first liquid phase product comprising C4+ compounds. The system can also include a flow restricting line having an inlet configured to receive the first gas phase product from an outlet of the indirect heat exchanger. The system can also include transport line having an inlet configured to receive the first gas phase product from an outlet of the flow restricting line. The flow restricting line can have an inner cross-sectional area that is <50% of an inner cross-sectional area of the transport line. The system can also include an analyzer that can have an inlet configured to receive the first gas phase product from an outlet of the transport line and to determine an at least a partial composition of the first gas phase product.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
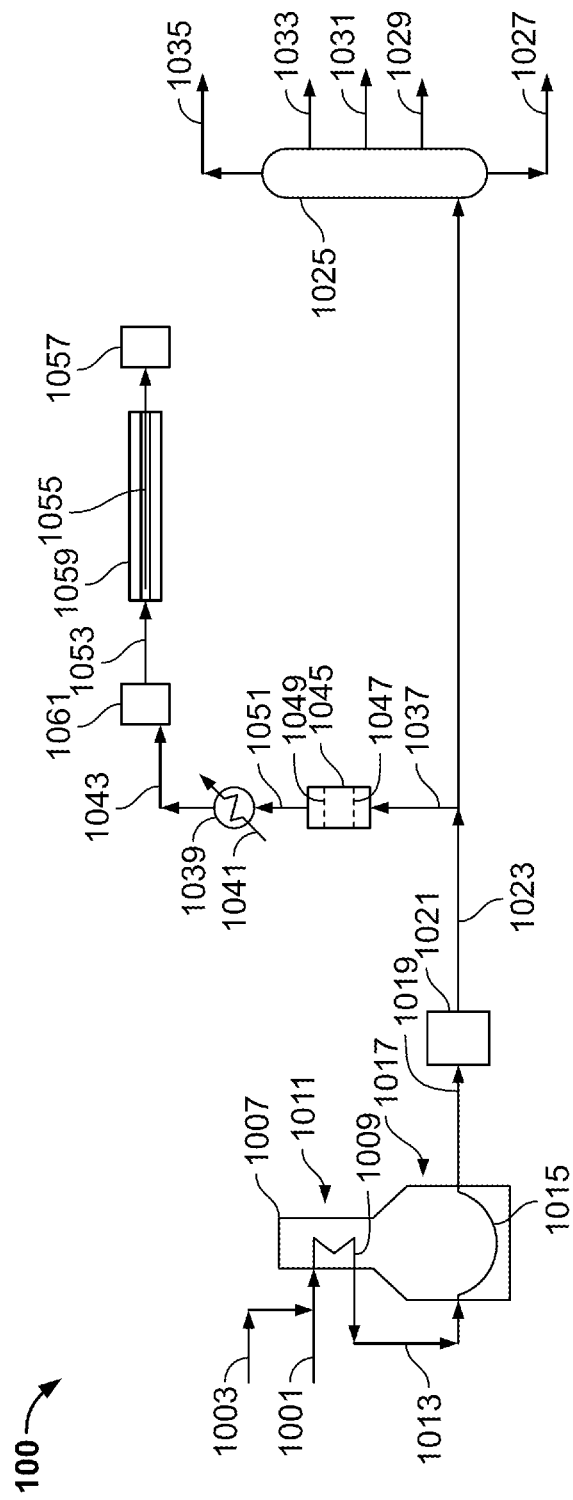
FIG. 1 depicts a schematic of an illustrative system for steam cracking a hydrocarbon to produce a steam cracker effluent and analyzing a composition of a C3− component separated from a cooled steam cracker effluent, according to one or more embodiments described.

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

The indefinite article "a" or "an", as used herein, means "at least one" unless specified to the contrary or the context clearly indicates otherwise. Thus, embodiments using "a separator" include embodiments where one or two or more separators are used, unless specified to the contrary or the context clearly indicates that only one separator is used. Likewise, embodiments using "a separation stage" include embodiments where one or two or more separation stages are used, unless specified to the contrary.

Certain embodiments and features are described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

The term "Cn compound" means a compound having n carbon atom(s) per molecule, or a mixture of multiple compounds each having n carbon atom(s) per molecule, where n is a positive integer. The term "Cn+ compound" means a compound having at least n carbon atom(s) per molecule, or a mixture of multiple compounds each having at least n carbon atom(s) per molecule, where n is a positive integer. The term "Cn− compound" means a compound having at most n carbon atom(s) per molecule, or a mixture of multiple compounds each having at most n carbon atoms per molecule, where n is a positive integer. The term "Cm-Cn compound" means a compound having at least m carbon atom(s) and at most n carbon atom(s) per molecule, or a mixture of multiple compounds each having at least m carbon atom(s) and at most n carbon atoms per molecule, where m and n are positive integers, and n>m.

As used herein, the term "hydrocarbon" means a class of compounds consisting of carbon atoms and hydrogen atoms. "Cn hydrocarbon" means a hydrocarbon having n carbon atom(s) per molecule, or a mixture of multiple hydrocarbons each having n carbon atom(s) per molecule, where n is a positive integer. The term "Cn+ hydrocarbon" means a hydrocarbon having at least n carbon atom(s) per molecule, or a mixture of multiple hydrocarbons each having at least n carbon atom(s) per molecule, where n is a positive integer. The term "Cn− hydrocarbon" means a hydrocarbon having at most n carbon atom(s) per molecule, or a mixture of multiple hydrocarbons each having at most n carbon atoms per molecule, where n is a positive integer. The term "Cm-Cn hydrocarbon" means a hydrocarbon having at least m carbon atom(s) and at most n carbon atom(s) per molecule, or a mixture of multiple hydrocarbons each having at least m carbon atom(s) and at most n carbon atoms per molecule, where m and n are positive integers, and n>m.

Conventional transfer line samplers are optimized to deliver a C3− sample separated from a cooled steam cracker effluent to the analyzer as fast as possible to obtain compositional analysis as fast as possible to enable adjustment(s) in processing conditions within the steam cracker to maintain an amount of desired products produced in the steam cracker as high as possible. It has been surprisingly and unexpectedly discovered that compromising the sample flow rate and transport time to the analyzer can provide a much more reliable liquid knockout that leads to a drier and cleaner C3− sample sent to the analyzer. Similarly, it has been surprisingly and unexpectedly discovered that the compromises in sample transport time are negligible compared to control valve and thermocouple response times that already exist. Therefore, sample transport time increases that are large compared to the current sample transport times are small compared to overall loop response time and provide a significant improvement in the reliability of the sample conditioning system and sample analysis.

As described in more detail below, the sample flow rate can be reduced by flowing the C3− sample through a flow restricting line. The flow restricting line can slow the flow of the sample there through and provide a location that can foul before other locations within the transfer line sampler and the transport line that conveys the separated C3− sample from the transfer line sampler via the flow restricting line to the analyzer. Since the flow restricting line has a cross-section much smaller than that of the downstream transport line, fouling typically occurs in the flow restricting line prior to in the transport line. As such, the flow restricting line can also be referred to as a "sacrificial flow restrictor" that once fouled can be easily replaced, and thereby protect the downstream transport line from fouling. Since the transport line can be significantly longer than the flow restriction line and may traverse through areas not easily, safely, or conveniently accessible to an operator, replacing or repairing a fouled transport line can be much more costly and much less convenient than replacing a fouled flow restricting line. The flow restricting line can be placed at a location conveniently accessible to an operator making its replacement easy. Spare flow restricting lines can be kept on-site and can be quickly replaced should the flow restricting line become fouled. In some embodiments, the length of time for the C3− sample to be separated from the sample of cooled steam cracker effluent, flow through the transport line, and into the analyzer can be >30 seconds, >35 seconds, >40 seconds, >45 seconds, >50 seconds, or >55 seconds. In some embodiments, the length time for the C3− sample to be separated from the sample of cooled steam cracker effluent, flow through the transport line, and into the analyzer can be 35 seconds, 40 seconds, 45 seconds, or 50 seconds to 55 seconds, 60 seconds, 65 seconds, 70 seconds, 80 seconds, 90 seconds, or longer.

In some embodiments, the flow restricting line can consume nominally 60% to 85%, e.g., 75% of the available pressure drop from the transfer line sampler to the analyzer. The significant localized pressure drop can result in a velocity reduction through the transfer line sampler and the transport line of 40% to 60%, e.g., 50%, which corresponds to roughly doubling the transport time of the sample. It also roughly doubles the contacting time and separation/cooling capability in the transfer line sampler when considered per unit mass rate of the sample delivered to the analyzer.

FIG. 1 depicts a schematic of an illustrative system 100 for steam cracking a hydrocarbon in line 1001 to produce a steam cracker effluent via line 1019 and analyzing a composition of a C3− component separated from a cooled steam cracker effluent in line 1023, according to one or more embodiments. The system 100 can include one or more steam crackers 1007, one or more steam cracker effluent heat exchange stages 1021, one or more primary fractionators 1025, one or more steam cracker effluent sampling lines 1037, one or more steam cracker sample heat exchange stages 1039, one or more flow restricting lines 1053, one or more transport lines 1055, and one or more analyzers 1057. In some embodiments, the system 100 can also include one or more optional filters 1045, one or more optional coalescers 1061, optional heat tracing 1059, or any combination thereof. The steam cracker sample heat exchange stage 1039, the optional filter 1045, and the optional coalescer 1061 can collectively be referred to as the transfer line sampler.

In some embodiments, the hydrocarbon feed in line 1001 can be mixed, blended, combined, or otherwise contacted with steam in line 1003 to produce a hydrocarbon and steam mixture in line 1005. The mixture in line 1005 can be heated within one or more convection coils 1009 disposed within a convection section 1011 of the steam cracker 1007 to produce a heated mixture via line 1013. In some embodiments, the mixture in line 1005 can be heated to a temperature of 200° C., 300° C., 400°, or 450° C. to 500° C., 600° C., 700° C., or 750° C. The heated mixture in line 1013 can be heated and subjected to steam cracking conditions within one or more radiant coils 1015 in a radiant section 1017 of the steam cracker 1007 to produce the steam cracker effluent via line 1019. The steam cracker effluent can have a coil outlet temperature upon exiting the radiant coil 1015.

It should be understood that while only one hydrocarbon feed via line 1001 is shown, the process is not limited to any particular number of hydrocarbon feeds. For example, the process can be compatible with a convection section 1011 and a radiant section 1017 that include 2, 3, 4, 6, 8, 10, 12, 16, or 18 or more sets of corresponding convection coils and radiant coils, respectively, for conveying in equal or unequal portions of a total hydrocarbon feed. It should also be understood that the hydrocarbon feed in line 1001 and any additional hydrocarbon feeds in additional feed lines can be the same or different with respect to one another. It should also be understood that the effluents from two or more steam crackers can be mixed, blended, or otherwise combined and introduced into the one or more heat exchange stages 1021. For example, effluents from 2, 3, 4, 5, 6, 7, 8, or more steam crackers can be combined and introduced into the one or more heat exchange stages. In other embodiments, when multiple different hydrocarbon feeds are cracked, the various steam cracker effluents can be processed separately with C3− samples from each cooled steam cracker effluent analyzed separately to enable better control over the product slate produced by cracking the various hydrocarbon feeds.

In some embodiments, the steam cracking conditions can include, but are not limited to, one or more of: exposing the heated mixture of the hydrocarbon feed and steam in line 1013 (or a vapor phase product separated therefrom) within the radiant coil(s) 1015 to a temperature (as measured at a radiant outlet of the steam cracking furnace) of ≥400° C., e.g., a temperature of about 700° C., about 800° C., or about 900° C. to about 950° C., about 1,000° C., or about 1050° C., a pressure of about 10 kPa-absolute to about 500 kPa-absolute or more, and/or a steam cracking residence time of about 0.01 seconds to about 5 seconds. In some embodiments, the hydrocarbon and steam mixture in line 1013 can include steam in an amount in of about 10 wt % to about 95 wt %, based on the weight of the hydrocarbon and steam mixture. In some embodiments, the heated mixture 1013 or a vapor phase product separated therefrom can be steam cracked according to the processes disclosed in U.S. Pat. Nos. 6,419,885; 7,993,435; 9,637,694; and 9,777,227; and International Patent Application Publication No. WO 2018/111574.

In some embodiments, the steam cracker effluent in line 1019 can be cooled by indirect heat exchange in one or more heat exchange stages 1021, e.g., via one or more transfer line exchangers, with steam to produce steam, e.g., medium pressure steam or superheated steam, and a cooled steam cracker effluent via line 1023. In some embodiments, the steam cracker effluent in line 1019 can be cooed by direct contact with a quench medium to produce the cooled steam cracker effluent via lines 1023. In other embodiments, the steam cracker effluent in line 1019 can be cooled by indirect heat exchange and by direct contact with a quench medium to produce the cooled steam cracker effluent via lines 1023.

In some embodiments, the quench medium that can be contacted with the steam cracker effluent in line 1023 can be or can include a utility fluid. In some embodiments, the utility fluid can be the same or similar to the utility fluids described in U.S. Pat. Nos. 9,090,836; 9,637,694; and 9,777,227; and International Patent Application Publication No. WO 2018/111574.

The cooled steam cracker effluent via line 1023 can be introduced into the primary fractionator 1025 from which a plurality of products can be recovered, such as steam cracker tar via line 1027, steam cracker quench oil via line 1029, steam cracker gas oil via line 1031, steam cracker naphtha via line 1033, and a process gas via line 1035.

In some embodiments, products that can be separated from the process gas in line 1035 can be or can include, but are not limited to, a tail gas, ethane, ethylene, propane, propylene, crude C4 hydrocarbons, or any combination thereof. In some embodiments, the products that can be separated from the cooled steam cracker effluent can be separated according to the processes and systems disclosed in U.S. Patent Application Publication No. 2014/0357923. Although at least a portion of the tar product can be used as a fuel, it is typically subjected to at least one hydroprocessing stage, to produce products of greater utility.

Suitable steam crackers, process gas recovery configurations, other equipment, and process conditions can include those disclosed in U.S. Pat. Nos. 6,419,885; 7,560,019; 7,993,435; 8,105,479; 8,197,668; 8,882,991; 9,637,694; 9,777,227; U.S. Patent Application Publication Nos.: 2014/0061096; 2014/0357923; 2016/0376511; 2018/0170832; 2019/0016975; and WO Publication No.: WO 2018/111574; WO/2020/096972; WO/2020/096974; WO/2020/096977; and WO/2020/096979.

Effluent Sampling

During steam cracking of the hydrocarbon feed, a sample of the cooled steam cracker effluent in line 1023 can be introduced into an inlet of a sample line 1037. In some embodiments, the sample can flow through the sample line 1037 and into an inlet of the steam cracker sample heat exchange stage 1039 from an outlet of the sample line 1037. In some embodiments, the steam cracker sample heat exchange stage 1039 can be a tube-in-tube heat exchanger. A heat transfer medium can be introduced via line 1041 and heat can be indirectly exchanged from the sample of the cooled steam cracker effluent to the heat transfer medium to produce a first gas phase product that can include C3− compounds and a first liquid phase product that can include condensed water and C4+ compounds. In some embodiments, the C3− compounds can be or can include, but are not limited to, methane, ethane, ethylene, propane, propylene, or any mixture thereof. In some embodiments, the C3− sample can also include molecular hydrogen. The first gas phase product can be recovered from the steam cracker sample heat exchange stage 1039 via line 1043. The condensed water and C4+ compounds can be sent back to the cooled steam cracker effluent in line 1023, removed from the system, or otherwise disposed of.

In some embodiments, the sample of the cooled steam cracker effluent in line 1023 can flow through the sample line 1037 and into an inlet of an optional filter 1045 from the outlet of the sample line 1037. The filter 1045, if present, can include one or more filter screens or other filter elements (two are shown 1047, 1049) and can produce a solids-lean sample via line 1051 that can be introduced into the steam cracker sample heat exchange stage 1039. In some embodiments, the first filter screen or other element 1047 can filter coarse particles and the second filter screen or other element 1049 can filter medium or fine particles, with respect to one another, from the sample of the cooled steam cracker effluent.

In some embodiments, the first gas phase product via line 1043 can be introduced into an inlet of a flow restricting line 1053. The first gas phase product can flow through the flow restricting line 1053, exit an outlet thereof, and flow into an inlet of a transport line 1055. The first gas phase product can flow through the transport line and into an analyzer 1057 that can determine an at least partial composition of the first gas phase product. In some embodiments, the analyzer 1057 can be a gas chromatograph. In other embodiments, the analyzer 1057 can be a spectrograph such as a near-infrared spectrometer or a Fourier transform near-infrared spectrometer (FT-NIR). In other embodiments, the analyzer 1057 can be a Raman spectrometer. In still other embodiments, the analyzer 1057 can include two or more different types of analyzers. The various analyzers that can be used and operation thereof are all well-known and understood.

The analyzer 1057 can measure the concentration of one or more key cracking products such as methane, propylene, and/or ethylene and/or the concentration of unconverted hydrocarbon feed remaining in the steam cracker effluent such as ethane and/or propane. In some embodiments, the coil outlet temperature of the steam cracker effluent can be increased or decreased based, at least in part, on the determined at least partial composition of the first gas phase product. In some embodiments, the coil outlet temperature of the steam cracker effluent can be increased or decreased by adjusting a feed rate of fuel fed into one or more burners disposed within the radiant section 1017 of the steam cracker furnace 1007 that heats the one or more radiant coils 1015, by adjusting a feed rate of the heated mixture in line 1013 introduced into the one or more radiant coils 1015, or a combination thereof. In some embodiments, the feed rate of fuel fed into the one or more burners disposed within the radian section 1017 can remain substantially constant such that an amount of heat produced by each of the one or more burners is substantially the same and the feed rate of the heated mixture in line 1013 can be adjusted to control the coil outlet temperature of the steam cracker effluent. By controlling the coil outlet temperature of the steam cracker effluent in line 1019, a desired amount of ethane and/or propane disappearance or selected ratios of methane, propylene, and ethylene in the product slate can optimize or at least improve operation of the steam cracker furnace and recovery section equipment.

In some embodiments, the flow restricting line 1053 can have an inner cross-sectional area that can be <50%, <45%, <40%, <35%, <30%, <25%, or <20% of an inner cross-sectional area of the transport line 1055. In some embodiments, the flow restricting line 1053 can have an inner cross-sectional area of 5 mm², 10 mm², 20 mm², 40 mm², 50 mm², or 60 mm² to 80 mm², 100 mm², 110 mm², 120 mm², or 130 mm². In some embodiments, the flow restricting line 1053 can have an inner diameter of 1.5 mm, 1.6 mm, 1.8 mm, 2 mm, 2.5 mm, or 3 mm to 4 mm, 4.5 mm, 5 mm, 5.5 mm, 6 mm, or 6.5 mm. In some embodiments, the flow restricting line 1053 can have a non-circular cross-sectional area, such as a triangular, rectangular, elliptical, oval, or other geometric shape. In some embodiments, the flow restricting line can have a length of 7 cm, 15 cm, 30 cm, or 45 cm to 60 cm, 75 cm, or 100 cm. In some embodiments, the length of the flow restricting line can be ≤100 cm, ≤75 cm, ≤60 cm, ≤45 cm, or ≤30 cm.

In some embodiments, an inner surface of the flow restricting line 1053 and/or an inner surface of the transport line 1055 can have a coating that can be chemically inert with respect to compounds in the first gas phase product. In some embodiments, the inner surface of the flow restricting line 1053 and/or the transport line 1055 can include a coating that includes polytetrafluoroethylene, chromium, amorphous silicon, or a combination thereof. In other embodiments, an inner surface of the flow restricting line 1053 and/or the transport line 1055 can be electro-polished. The flow restricting line 1053 and/or the transport line 1055 can be drawn through an acidic solution under an electric field that can remove small imperfections inside the tubes. In some embodiments, in addition to the inner surface of the flow restricting line 1053 and/or the transport line 1055 being electro-polished, the inner surface can further include a silicon coating, e.g., amorphous silicon, disposed thereon.

In some embodiments, the transport line 1055 can be heated via heat tracing 1059, e.g., electrical heat tracing. In some embodiments, the heat tracing 1059 can maintain a temperature of the first gas phase product at a temperature the first gas phase product enters into the transport line 1055 from the flow restricting line 1053. In other embodiments, the heat tracing 1059 can heat the first gas phase product to a temperature greater than a temperature the first gas phase product enters into the transport line 1055. As such, the heat tracing 1059 can heat the first gas phase product to a temperature that is 0° C., 1° C., 3° C., 5° C., 7° C. or 10° C. to 15° C., 17° C., 20° C., 23° C., or 25° C. greater than a temperature of the first gas phase product when introduced into the transport line 1055 from the flow restricting line 1053. In some embodiments, the heat tracing 1059 can maintain a temperature of the first gas phase product at a temperature the first gas phase product enters into the transport line 1055 from the flow restricting line 1053 or heat the first gas phase product to a temperature that is <25° C., <23° C., <20° C., <17° C., <15° C., <10° C., <7° C., <5° C., <3° C., or <1° C. greater than a temperature of the first gas phase product when introduced into the transport line 1055 from the flow restricting line 1053.

In some embodiments, the first gas phase product in line 1043 can primarily include C3− compounds and a minor amount of C4+ compounds, liquid water, vaporized water, or a mixture thereof. In such embodiments, the first gas phase product via line 1043 can be introduced into one or more optional coalescers 1061. The coalescer 1061 can separate at least a portion of the C4+ compounds, liquid water, and/or vaporized water from the first gas phase product to produce a second gas phase product comprising less C4+ compounds than the first gas phase product and a second liquid phase product comprising C4+ compounds. The second gas phase product can flow from an exit of the coalescer 1061, through the flow restricting line 1053, into and through the transport line 1055, and into the analyzer 1057.

Figure 2:
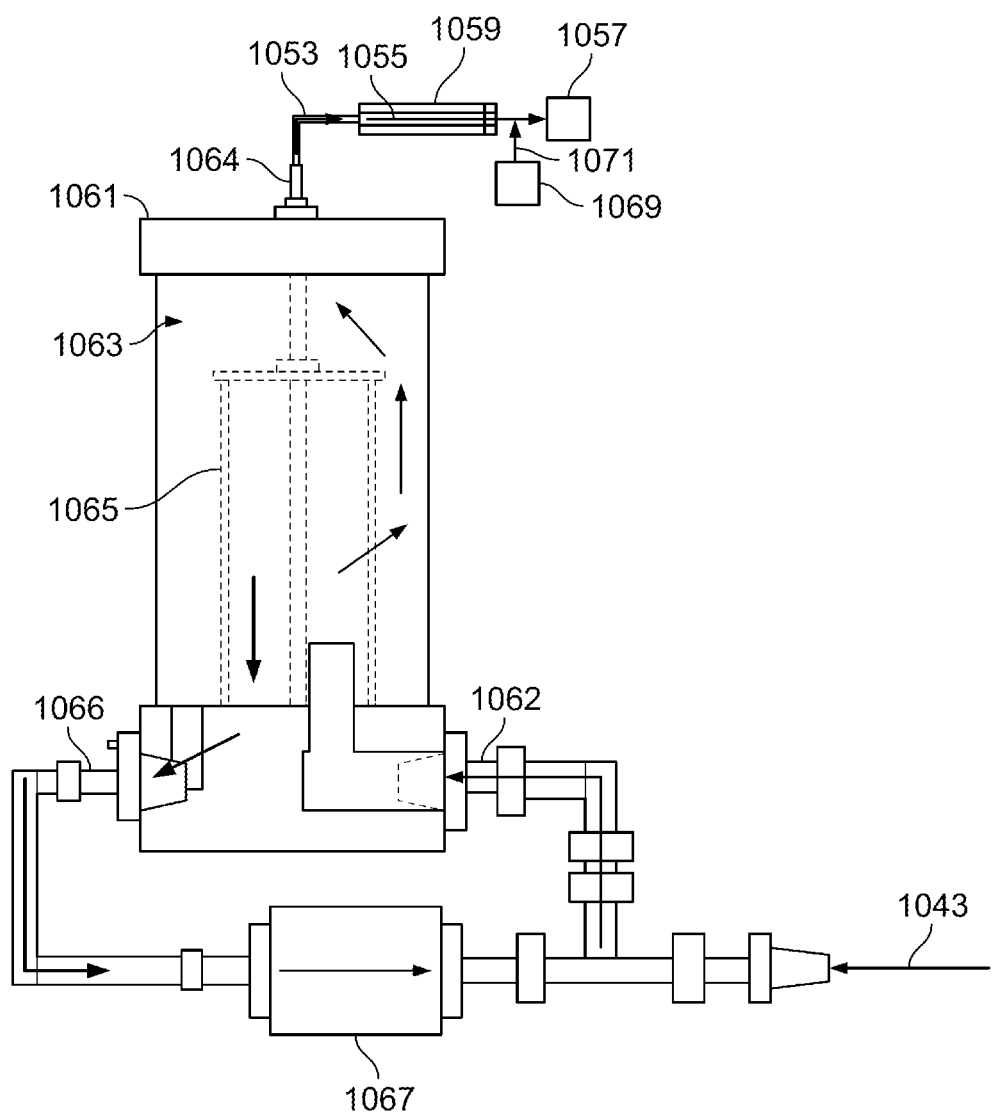
FIG. 2 depicts a schematic of an illustrative coalescer that can be used during separation of the C3− component in the system shown in FIG. 1, according to one or more embodiments described.

FIG. 2 depicts a schematic of an illustrative coalescer 1061 that can be used during separation of the C3− component in the system 100 shown in FIG. 1, according to one or more embodiments. The first gas phase product via line 1043 can be introduced into the coalescer 1061 via inlet 1062 and can flow into an internal volume 1063 of the coalescer 1061. The internal volume 1063 of the coalescer 1061 can include coalescing elements 1065. The first gas phase product can contact the coalescing elements 1065 and at least a portion of any C4+ compound(s) and/or liquid water can be separated from the C3− compounds to produce a second gas phase product that can exit the coalescer 1061 via a gas outlet 1064 into the flow restricting line 1053. The separated C4+ compound(s) and/or liquid water can flow downward and exit the coalescer 1061 via liquid outlet 1066, flow through a check valve 1067 and back into line 1043 to the steam cracker sample heat exchange stage 1039. In some embodiments, the check valve 1067 can have a cracking pressure that is >50%, e.g., 60% to 70%, such as 66.7%, of the pressure within the transfer line sampler and an optional periodic liquid backflush process (further discussed below). The cracking pressure of the check valve 1067 can prevent liquid from flowing back into the coalescer 1061.

It should be noted that the coalescer 1061 can be oriented upside down as compared to the conventional installation of coalescers such that the inlet 1062 of the coalescer 1061 the first gas phase product is introduced and the liquid outlet 1066 of the coalescer 1061 the second liquid phase product is recovered are located toward the bottom of the coalescer 1061 and the gas outlet 1064 of the coalescer 1061 the second gas phase product is recovered from is located toward the top of the coalescer 1061.

Installing the coalescer 1061 upside down allows transport line 1055 and the flow restricting line 1053 to be periodically backflushed with a flushing medium. In some embodiments, the introduction of the first gas phase product into the flow restricting line 1053 can be stopped and the coalescer 1061 can be backflushed by introducing the flushing medium into the transport line 1055, the flow restricting line 1053, and/or the internal volume 1063 of the coalescer 1061. In some embodiments, a flushing medium can be supplied from a storage vessel 1069 via line 1071. In some embodiments, the flushing medium can be introduced into the outlet of the transport line 1055, anywhere between the inlet and outlet of the transport line 1055, an outlet of the flow restricting line 1053, anywhere between the inlet and outlet of the flow restricting line 1055, or into the internal volume 1063 of the coalescer 1061. The flushing medium can flow through the transport line 1055, the flow restricting line 1053, the internal volume 1063 of the coalescer 1061, or a combination thereof and can exit through the liquid outlet at the bottom, flow through the check valve 1067, into line 1043 to the steam cracker sample heat exchange stage 1039, and back into line 1023.

The flushing medium can be or can include a solvent, aromatic hydrocarbons, steam condensate, nitrogen, sample carrier gas, hydrogen, or any mixture thereof. The solvent can be or can include, but is not limited to, acetone, turpentine, methyl acetate, ethyl acetate, hexane, citrus terpenes, ethanol, or any mixture thereof. The aromatic hydrocarbons can be or can include, but are not limited to, toluene, benzene, ethylbenzene, ortho-xylene, meta-xylene, para-xylene, phenol, aniline, or any mixture thereof. The sample carrier gas can be any suitable gas such as nitrogen, argon, helium, or any mixture thereof.

In some embodiments, the heat tracing 1059 can be turned off when the flushing medium is introduced into the transport line 1055. In other embodiments, the heat tracing 1059 can maintain heating or increase heating to heat the flushing medium to a desired temperature.

In some embodiments, the heat tracing 1059 can heat the flushing medium to a temperature that is 0° C., 1° C., 3° C., 5° C., 7° C. or 10° C. to 15° C., 17° C., 20° C., 23° C., or 25° C. greater than the temperature of the first gas phase product when introduced into the transport line 1055 from the flow restricting line 1053. In other embodiments, the heat tracing 1059 can heat the flushing medium to a temperature that is 0° C., 1° C., 3° C., 5° C., 7° C. or 10° C. to 30° C., 35° C., 40° C., 45° C., or 50° C. greater than the temperature of the first gas phase product when introduced into the transport line 1055 from the flow restricting line 1053.

It should be understood that while a mechanical coalescer 1061 is shown and described, in some embodiments, the coalescer 1061 can be or can include one or more electrostatic coalescers. In other embodiments, the coalescer 1061 can include at least one mechanical coalescer and at least one electrostatic coalescer.

Hydrocarbon Feed

In some embodiments, the hydrocarbon feed in line 1001 can be or include, but is not limited to, relatively high molecular weight hydrocarbons ("heavy feedstocks"), such as those that produce a relatively large amount of steam cracker tar ("SCT") during steam cracking. Examples of heavy feedstocks can include one or more of steam cracked gas oil and residues, gas oils, heating oil, jet fuel, diesel, kerosene, coker naphtha, steam cracked naphtha, catalytically cracked naphtha, hydrocrackate, reformate, raffinate reformate, Fischer-Tropsch liquids, Fischer-Tropsch gases, distillate, crude oil, atmospheric pipestill bottoms, vacuum pipestill streams including bottoms, gas oil condensates, heavy non-virgin hydrocarbon streams from refineries, vacuum gas oils, heavy gas oil, naphtha contaminated with crude, atmospheric residue, heavy residue, C4/residue admixture, naphtha/residue admixture, gas oil/residue admixture, crude oil, or any mixture thereof. In some embodiments, the hydrocarbon feed in line 1001 can be or can include, but is not limited to, lighter hydrocarbons such as $C_1$-$C_5$ alkanes, naphtha distillate, aromatic hydrocarbons, or any mixture thereof. In some embodiments, as noted above, two or more hydrocarbon feeds can be introduced into the steam cracker and the two hydrocarbon feeds can be the same or different with respect to one another.

In some embodiments, a first hydrocarbon feed that includes one or more lighter hydrocarbons and a second hydrocarbon feed that includes one or more heavy feedstocks can be introduced into the steam cracker as independent feeds. In some examples, the hydrocarbon feed in line 1001 can have a nominal final boiling point ≥315° C., ≥399° C., ≥454° C., or ≥510° C. Nominal final boiling point means the temperature at which 99.5 wt % of a particular sample has reached its boiling point.

In other embodiments, the hydrocarbon feed in line 1001 can include one or more relatively low molecular weight hydrocarbon (light feedstocks), particularly those aspects with relatively high yields of $C_2$ unsaturates (ethylene and acetylene). Light feedstocks can include substantially saturated hydrocarbon molecules having fewer than five carbon atoms, e.g., ethane, propane, and mixtures thereof (e.g., ethane-propane mixtures or "E/P" mix). For ethane cracking, a concentration of at least 75 wt % of ethane is typical. For the E/P mix, a concentration of at least 75 wt % of ethane plus propane is typical, the amount of ethane in the E/P mix can be ≥20 wt % based on the weight of the E/P mix, e.g., of about 25 wt % to about 75 wt %. The amount of propane in the E/P mix can be, e.g., ≥20 wt %, based on the weight of the E/P mix, such as of about 25 wt % to about 75 wt %. Suitable hydrocarbon feeds can be or can include those described in U.S. Pat. Nos. 7,138,047; 7,993,435; 8,696,888; 9,327,260; 9,637,694; 9,657,239; and 9,777,227; and International Patent Application Publication No. WO 2018/111574.

Optionally, e.g., when the hydrocarbon feed in line 1001 includes certain heavy feedstocks, the system 100 can include one or more vapor/liquid separators (sometimes referred to as flash pot or flash drum) integrated therewith. When used, the vapor-liquid separator can be configured to upgrade the hydrocarbon feed, e.g., by upgrading the hydrocarbon and steam mixture, upstream of the steam cracking furnace's radiant section 112. In some embodiments, it can be desirable to integrate a vapor-liquid separator with the furnace when the hydrocarbon feed includes ≥1 wt % of non-volatiles, e.g., ≥5 wt %, such as about 5 wt % to about 50 wt % of non-volatiles having a nominal boiling point of ≥760° C. In some embodiments, it can be desirable to integrate a vapor/liquid separator with the furnace when the non-volatiles include asphaltenes, such as ≥about 0.1 wt % asphaltenes based on the weight of the hydrocarbon feed, e.g., ≥about 5 wt %. Conventional vapor/liquid separation devices can be utilized to do this, though the invention is not limited thereto. Examples of such conventional vapor/liquid separation devices can include those disclosed in U.S. Pat. Nos. 7,138,047; 7,090,765; 7,097,758; 7,820,035; 7,311,746; 7,220,887; 7,244,871; 7,247,765; 7,351,872; 7,297,833; 7,488,459; 7,312,371; 6,632,351; 7,578,929; and 7,235,705. A vapor phase can be separated from the hydrocarbon feed in the vapor/liquid separation device. The separated vapor phase can be conducted away from the vapor/liquid separator to the radiant coils 115, 117 for steam cracking. The liquid-phase separated from the hydrocarbon feed can be conducted away from the vapor/liquid separation device, e.g., for storage and/or further processing.

The foregoing discussion can be further described with reference to the following non-limiting examples.

EXAMPLES

The Table below shows the response time breakdown from the transfer line sampler (TLS) to control move execution for a conventional system that does not include the flow restricting line and the coalescer and the response time breakdown from the TLS to control move execution for a system that does include the flow restricting line and the coalescer. As shown in the Table, the transport time of the sample through the transfer line sampler (TLS) to the transfer line analyzer (TLA) doubled from 30 seconds to 60 seconds, but this large increase in transport time only added about 2% to about 5% to the total response time. It was found that the reliability of the transfer line sampler, transport line, and transfer line analyzer increased from about 60% reliability to greater than 90% reliability.

| Response Time Breakdown from Transfer Line Sampler to Control Move Execution | | |
|---|---|---|
| Step | Seconds | Seconds |
| Sample through TLS to TLA | 30 | 60 |
| TLA Cycles to Sample Analysis | 360-1200 | 360-1200 |
| Setpoint to Coil-Outlet-Temperature | 0 | 0 |
| Feed Valve Moves | 0 | 0 |
| Coil-Outlet-Temperature reaches 95% of Setpoint | 250 | 250 |
| Total Time to Control Move | 640-1480 | 670-1510 |

LISTING OF EMBODIMENTS

This disclosure further includes the following non-limiting embodiments.

A1. A process for analyzing a composition of a C3- component separated from a steam cracker effluent, comprising: steam cracking a hydrocarbon feed within one or more radiant coils of a steam cracker to produce a steam cracker effluent having a coil outlet temperature; cooling the steam cracker effluent to produce a cooled steam cracker effluent; separating a sample from the cooled steam cracker effluent; indirectly exchanging heat from the sample to a heat transfer medium to produce a first gas phase product comprising C3- compounds and a first liquid phase product comprising C4+ compounds; flowing the first gas phase product through a flow restricting line and into a transport line, wherein the flow restricting line has an inner cross-sectional area that is <50% of an inner cross-sectional area of the transport line; flowing the first gas phase product through the transport line and into an analyzer; and determining an at least partial composition of the first gas phase product.

A2. The process of A1, further comprising increasing or decreasing the coil outlet temperature of the steam cracker effluent based, at least in part, on the determined at least partial composition of the first gas phase product.

A3. The process of A2, wherein the coil outlet temperature of the steam cracker effluent is increased or decreased by adjusting a feed rate of fuel fed into one or more burners disposed within a furnace that heats the one or more radiant coils.

A4. The process of any of A1 to A3, further comprising heating the transport line by heat tracing at a temperature that is 0° C. to 25° C. greater than a temperature of the first gas phase product when introduced into the transport line from the flow restricting line.

A5. The process of any of A1 to A4, wherein an inner surface of the flow restricting line comprises a coating that is chemically inert with respect to compounds in the first gas phase product.

A6. The process of any of A1 to A5, wherein an inner surface of the flow restricting line comprises a coating, and wherein the coating comprises polytetrafluoroethylene, chromium, amorphous silicon, or a combination thereof.

A7. The process of any of A1 to A5, wherein an inner surface of the flow restricting line is electro-polished.

A8. The process of A7, wherein the electro-polished inner surface of the flow restricting line comprises a silicon coating.

A9. The process of A8, wherein the silicon coating comprises amorphous silicon.

A10. The process of any of A1 to A9, further comprising flowing the first gas phase product through a coalescer, wherein: the first gas phase product comprises primarily C3− compounds and a minor amount of C4+ compounds, the coalescer separates at least a portion of the C4+ compounds from the first gas phase product to produce a second gas phase product comprising less C4+ compounds than the first gas phase product and a second liquid phase product comprising C4+ compounds, and the second gas phase product flows through the flow restricting line, into the transport line, through the transport line, and into the analyzer.

A11. The process of A10, wherein the coalescer is oriented upside down such that an inlet of the coalescer where the first gas phase product is introduced and a liquid outlet of the coalescer where the second liquid phase product is recovered are located toward the bottom of the coalescer and a gas outlet of the coalescer where the second gas phase product is recovered from is located toward the top of the coalescer.

A12. The process of A11, further comprising periodically stopping introduction of the first gas phase product into the inlet of the coalescer and backflushing the coalescer by introducing a flushing medium into the coalescer that exits the coalescer through the liquid outlet.

A13. The process of A12, wherein the flushing medium comprises one or more aromatic compounds, liquid water, nitrogen, a sample carrier gas, hydrogen, or a mixture thereof.

A14. The process of any of A1 to 13, further comprising flowing the sample through a filter comprising one or more filter screens to remove at least a portion of any solids present in the sample to produce a solids-lean sample, wherein the heat is indirectly exchanged from the solids-lean sample to the heat transfer medium to produce the first gas phase product and the first liquid phase product.

A15. The process of any of A1 to A14, wherein an inner cross-sectional area of the flow restricting line is 5 mm$^2$ to 130 mm$^2$.

A16. The process of any of A1 to A15, wherein the analyzer comprises a gas chromatograph.

A17. The process of any of A1 to A16, further comprising:
allowing fouling to occur in the flow restricting line before fouling occurs in the transport line; and
replacing the fouled flow restricting line with a clean flow restricting line, thereby protecting the transport line from fouling.

B1. A system for analyzing a composition of a C3− component separated from a steam cracker effluent, comprising: a sample line having an inlet configured to receive a sample of a steam cracker effluent from a steam cracker effluent line; an indirect heat exchanger having an inlet configured to receive the sample from an outlet of the sample line and to cool the sample by indirect heat exchange with a heat transfer medium to produce a first gas phase product comprising C3− compounds and a first liquid phase product comprising C4+ compounds; a flow restricting line having an inlet configured to receive the first gas phase product from an outlet of the indirect heat exchanger, a transport line having an inlet configured to receive the first gas phase product from an outlet of the flow restricting line, wherein the flow restricting line has an inner cross-sectional area that is <50% of an inner cross-sectional area of the transport line; and an analyzer having an inlet configured to receive the first gas phase product from an outlet of the transport line and to determine an at least a partial composition of the first gas phase product.

B2. The system of B1, further comprising heat tracing disposed at least partially about the transport line configured to heat the transport line to a temperature that is 0° C. to 25° C. greater than a temperature of first gas phase product when received by the inlet of the transport line.

B3. The system of B1 or B2, further comprising a coalescer having an inlet configured to receive the first gas phase product from the outlet of the indirect heat exchanger, wherein: the first gas phase product primarily comprises C3− compounds and a minor amount of C4+ compounds, the coalescer is configured to separate at least a portion of the C4+ compounds from the first gas phase product to produce a second gas phase product comprising less C4+ compounds than the first gas phase product and a second liquid phase product comprising C4+ compounds, the inlet of the flow restricting line is configured to receive the second gas phase product from a gas outlet of the coalescer, the inlet of the sample transport line is configured to receive the second gas phase product, and the inlet of the analyzer is configured to receive the second gas phase product and to determine an at least partial composition of the second gas phase product.

B4. The system of B3, wherein the coalescer is oriented upside down such that the inlet configured to receive the first gas phase product and an outlet configured to expel the second liquid phase product from the coalescer are located toward the bottom of the coalescer and the gas outlet is located toward the top of the coalescer.

B5. The system of B4, wherein the outlet configured to expel the second gas phase product from the coalescer is also configured to periodically introduce a flushing medium into the coalescer to backflush the coalescer.

B6. The system of any of B1 to B5, further comprising a filter comprising one or more filter screens, the filter configured to receive the sample from the outlet of the sample line and to remove at least a portion of any solids in the sample to produce a solids-lean sample, wherein the inlet of the indirect heat exchanger is configured to receive the solids-lean sample from an outlet of filter and to cool the sample to produce the first gas phase product and the first liquid phase product.

B7. The system of any of B1 to B6, wherein an inner cross-sectional area of the flow restricting line is 5 mm$^2$ to 130 mm$^2$.

B8. The system of any of B1 to B7, wherein an inner surface of the flow restricting line comprises a coating that is configured to be chemically inert with respect to compounds in the second gas phase product.

B9. The system of any of B1 to B8, wherein an inner surface of the flow restricting line comprises a coating, and wherein the coating comprises polytetrafluoroethylene, chromium, amorphous silicon, or a combination thereof.

B10. The system of any of B1 to B8, wherein an inner surface of the flow restricting line is electro-polished.

B11. The system of B10, wherein the electro-polished inner surface of the flow restricting line comprises a silicon coating.

B12. The system of B11, wherein the silicon coating comprises amorphous silicon.

B13. The system of any of B1 to B12, wherein the analyzer comprises a gas chromatograph.

B14. The system of any of B1 to B13, wherein the flow restricting line is located in an area accessible to an operator and/or configured to be replaceable. Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for analyzing a composition of a C3− component separated from a steam cracker effluent, comprising:
   steam cracking a hydrocarbon feed within one or more radiant coils of a steam cracker to produce a steam cracker effluent having a coil outlet temperature;
   cooling the steam cracker effluent to produce a cooled steam cracker effluent;
   separating a sample from the cooled steam cracker effluent;
   indirectly exchanging heat from the sample to a heat transfer medium to produce a first gas phase product comprising C3− compounds and a first liquid phase product comprising C4+ compounds;
   flowing the first gas phase product through a flow restricting line and into a transport line, wherein the flow restricting line has an inner cross-sectional area that is <50% of an inner cross-sectional area of the transport line;
   flowing the first gas phase product through the transport line and into an analyzer; and
   determining an at least partial composition of the first gas phase product.

2. The process of claim 1, further comprising increasing or decreasing the coil outlet temperature of the steam cracker effluent based, at least in part, on the determined at least partial composition of the first gas phase product.

3. The process of claim 2, wherein the coil outlet temperature of the steam cracker effluent is increased or decreased by adjusting a feed rate of fuel fed into one or more burners disposed within a furnace that heats the one or more radiant coils.

4. The process of claim 1, further comprising heating the transport line by heat tracing at a temperature that is 0° C. to 25° C. greater than a temperature of the first gas phase product when introduced into the transport line from the flow restricting line.

5. The process of claim 1, wherein an inner surface of the flow restricting line comprises a coating that is chemically inert with respect to compounds in the first gas phase product.

6. The process of claim 1, wherein an inner surface of the flow restricting line comprises a coating, and wherein the coating comprises polytetrafluoroethylene, chromium, amorphous silicon, or a combination thereof.

7. The process of claim 1, further comprising flowing the first gas phase product through a coalescer, wherein:
   the first gas phase product comprises primarily C3− compounds and a minor amount of C4+ compounds,
   the coalescer separates at least a portion of the C4+ compounds from the first gas phase product to produce a second gas phase product comprising less C4+ compounds than the first gas phase product and a second liquid phase product comprising C4+ compounds, and
   the second gas phase product flows through the flow restricting line, into the transport line, through the transport line, and into the analyzer.

8. The process of claim 7, wherein the coalescer is oriented upside down such that an inlet of the coalescer where the first gas phase product is introduced and a liquid outlet of the coalescer where the second liquid phase product is recovered are located toward the bottom of the coalescer and a gas outlet of the coalescer where the second gas phase product is recovered from is located toward the top of the coalescer.

9. The process of claim 8, further comprising periodically stopping introduction of the first gas phase product into the inlet of the coalescer and backflushing the coalescer by introducing a flushing medium into the coalescer that exits the coalescer through the liquid outlet.

10. The process of claim 1, further comprising flowing the sample through a filter comprising one or more filter screens to remove at least a portion of any solids present in the sample to produce a solids-lean sample, wherein the heat is indirectly exchanged from the solids-lean sample to the heat transfer medium to produce the first gas phase product and the first liquid phase product.

11. The process of claim 1, wherein an inner cross-sectional area of the flow restricting line is 5 mm$^2$ to 130 mm$^2$.

12. The process of claim 1, wherein the analyzer comprises a gas chromatograph.

13. The process of claim 1, further comprising:
   allowing fouling to occur in the flow restricting line before fouling occurs in the transport line; and
   replacing the fouled flow restricting line with a clean flow restricting line, thereby protecting the transport line from fouling.

14. A system for analyzing a composition of a C3− component separated from a steam cracker effluent, comprising:
   a sample line having an inlet configured to receive a sample of a steam cracker effluent from a steam cracker effluent line;
   an indirect heat exchanger having an inlet configured to receive the sample from an outlet of the sample line and to cool the sample by indirect heat exchange with a heat transfer medium to produce a first gas phase product comprising C3− compounds and a first liquid phase product comprising C4+ compounds;
   a flow restricting line having an inlet configured to receive the first gas phase product from an outlet of the indirect heat exchanger;
   a transport line having an inlet configured to receive the first gas phase product from an outlet of the flow restricting line, wherein the flow restricting line has an inner cross-sectional area that is <50% of an inner cross-sectional area of the transport line; and
   an analyzer having an inlet configured to receive the first gas phase product from an outlet of the transport line and to determine an at least a partial composition of the first gas phase product.

15. The system of claim 14, further comprising heat tracing disposed at least partially about the transport line configured to heat the transport line to a temperature that is 0° C. to 25° C. greater than a temperature of first gas phase product when received by the inlet of the transport line.

16. The system of claim 14, further comprising a coalescer having an inlet configured to receive the first gas phase product from the outlet of the indirect heat exchanger, wherein:
the first gas phase product primarily comprises C3− compounds and a minor amount of C4+ compounds,
the coalescer is configured to separate at least a portion of the C4+ compounds from the first gas phase product to produce a second gas phase product comprising less C4+ compounds than the first gas phase product and a second liquid phase product comprising C4+ compounds,
the inlet of the flow restricting line is configured to receive the second gas phase product from a gas outlet of the coalescer,
the inlet of the sample transport line is configured to receive the second gas phase product, and
the inlet of the analyzer is configured to receive the second gas phase product and to determine an at least partial composition of the second gas phase product.

17. The system of claim 14, wherein the coalescer is oriented upside down such that the inlet configured to receive the first gas phase product and an outlet configured to expel the second liquid phase product from the coalescer are located toward the bottom of the coalescer and the gas outlet is located toward the top of the coalescer.

18. The system of claim 14, further comprising a filter comprising one or more filter screens, the filter configured to receive the sample from the outlet of the sample line and to remove at least a portion of any solids in the sample to produce a solids-lean sample, wherein the inlet of the indirect heat exchanger is configured to receive the solids-lean sample from an outlet of filter and to cool the sample to produce the first gas phase product and the first liquid phase product.

19. The system of claim 18, wherein the outlet configured to expel the second liquid phase product from the coalescer is also configured to periodically introduce a flushing medium into the coalescer to backflush the coalescer.

20. The system of claim 14 wherein an inner surface of the flow restricting line comprises a coating that is configured to be chemically inert with respect to compounds in the second gas phase product.

21. The system of claim 14, wherein the analyzer comprises a gas chromatograph.

22. The system of claim 14, wherein the flow restricting line is located in an area accessible to an operator and/or configured to be replaceable.

* * * * *